United States Patent [19]

Akutsu et al.

[11] Patent Number: 4,967,206

[45] Date of Patent: Oct. 30, 1990

[54] PRINT STORAGE MEDIUM

[75] Inventors: Eiichi Akutsu; Koichi Saitoh; Yoshihiko Fujimura; Nanao Inoue; Kiyoshi Horie; Hiroo Soga; Hiroshi Fujimagari, all of Kanagawa, Japan

[73] Assignee: Fuji Xerox Co., Ltd., Tokyo, Japan

[21] Appl. No.: 281,320

[22] Filed: Dec. 8, 1988

[30] Foreign Application Priority Data

Dec. 9, 1987 [JP] Japan ................................ 62-309667

[51] Int. Cl.[5] ................................................ G01D 9/00

[52] U.S. Cl. ................................ 346/135.1; 346/76 R

[58] Field of Search .............. 346/135.1, 76 R, 76 PH

[56] References Cited

U.S. PATENT DOCUMENTS

| | | | |
|---|---|---|---|
| 4,477,198 | 10/1984 | Bowlds et al. | 346/76 PH |
| 4,810,119 | 3/1989 | Afzali-Ardakani | 346/76 PH |

FOREIGN PATENT DOCUMENTS

| | | | |
|---|---|---|---|
| 53-84735 | 7/1978 | Japan . | |
| 0062191 | 5/1981 | Japan | 346/76 R |
| 56-93585 | 7/1981 | Japan . | |
| 1205189 | 9/1986 | Japan | 346/76 R |
| 0290554 | 12/1987 | Japan | 346/76 PH |

OTHER PUBLICATIONS

Nakano, Shiro et al., "Development of Electro-Sensitive Transfer Material", Journal of the Institute of Image Electronics Engineers of Japan, 1982, vol. 11, No. 1.

*Primary Examiner*—Bruce A. Reynolds
*Assistant Examiner*—Huan Tran
*Attorney, Agent, or Firm*—Finnegan, Henderson, Farabow, Garrett, and Dunner

[57] ABSTRACT

A print storage medium comprises a heat-generating layer for generating heat with an electrical signal input in accordance with a picture, the signal being supplied from a printing signal applying electrode to which the heat-generating layer is in pressure contact, an electrically conductive layer, an ink layer provided on the heat generated layer. The print storage medium is further provided with a plurality of microscopic electrodes on the storage medium with which the printing signal-applying electrode is in pressure contact, each of the microscopic electrodes being isolated from others. The electrically conductive layer may be formed of striped electrodes. The isolated microscopic patterns may be formed of electrically conductive ceramics or of electrically conductive resin.

13 Claims, 6 Drawing Sheets

PRINT STORAGE MEDIUM

BACKGROUND OF THE INVENTION

1. Field of the Invention

This invention relates to a print storage medium in which an electric signal is converted into thermal energy and ink is then transferred onto a transfer material with the aid of this thermal energy, thereby effecting print-storage.

2. Description of Related Art

There are various conventional print-storage devices in which electric energy is converted into thermal energy. One such device includes a thermal storage medium provided with either a heat-softening ink layer or a heat-sublimating ink layer on the back surface of a base sheet of thermal sensitive paper. The front surface of the base sheet is provided with a heat sensitive color developing layer that is depressed against a heating-head. The heating-head generates heat in response to a picture signal for softening an ink layer formed on the back surface of the base sheet for transfer onto a print-storage transfer material. (See, for example, Japanese Patent Preliminary Publication No. 53-84735.)

In a second prior art print-storage device, an electric picture signal is applied to a support element through a needle electrode. Current flows through the support element to the ink layer of a print-storage medium, generating heat and melting the ink. The melted ink is then transferred onto a transfer material. The support element is typically in the form of a ribbon made of dispersed metal powder and resin but can also be made of an electrically conductive film having a high resistance. (Gazo Denshi Gakkai Publication. 1982. Vol. 11 No. 1, paper No. 17 of 12th National Conference)

A third print-storage device is shown in FIG. 1, which depicts a thermal print-storage medium having an upper layer 30 of low resistance, a lower layer 31 of high resistance, an electrically conductive layer 32, and an ink layer 33. These layers are placed one over the other to form a print-storage medium 34. Needle electrode 35 and return-current electrode 36 are in contact with the surface of the upper layer 30 of print-storage medium 34. A current is run through needle electrode 35, upper layer 30, lower layer 31, conductor 32, and return electrode 36 to generate heat. The heat generated causes the ink layer 33 to melt and the melted ink is then transferred onto a transfer material. (Japanese Patent Preliminary Publication No. 56-93585) However, these prior art devices have several drawbacks.

The first prior art device outlined above, is a type in which heat generated by the heating head is transferred from the thermal light-emitting layer to the ink layer through the base sheet. This causes the ink layer to melt for printing. One drawback with this device is that conductive heat transfer requires a long time, and therefore reduces printing speed. Also, the heat generated by the heating head is diffused during heat transfer, reducing the amount of heat energy conducted to the ink layer. Therefore, the type material usable as the ink layer is severely restrained, and dot modulation (wherein the printed dot size is varied in response to the amount of heat energy applied) is virtually impossible.

The second prior art device outlined above is a type in which the ink layer is electrically conductive to generate heat. One drawback with this method is that the ink layer is made conductive by adding conductive materials. This makes it difficult to control the color tone of the ink layer. Further, this device causes a wider area of the ink layer to be heated due to heat conduction which leads to poor dot printing precision. In addition, electrical anisotropy of the ink-supporting material is inadequate, causing current to flow in areas other than those intended. Leakage within the ink supporting material also causes a large amount of energy loss.

The third prior art device outlined above has a drawback similar to that of the second method. Upper layer 30 does not exhibit sufficient electrical anisotropy, causing current to flow through areas other than those intended. Thus, leakage occurs within the upper layer 30, leading to a large amount of energy loss. In this method, a needle electrode 35 is caused to contact upper surface 30 of low resistance as shown in FIG. 1. Needle electrode 35 contacts upper layer 30 at a "point." Since the contact area is usually much smaller than the cross-sectional area of needle electrode 35, the contact resistance between the needle electrode 35 and the upper layer 30 is high. The current flowing through the upper layer 30 is concentrated as shown in FIG. 2. Upper layer 30 disturbs the uniform flow of current leading to a nonuniform generation of heat. In addition, upper layer 30 can be damaged by excess current flow through the contact point.

Further, since the current through upper layer 30 is concentrated at the contact point, the amount of heat cannot be easily controlled by varying the amount of current through the needle electrode 30. This causes improper gradation within a picture. Since current flows from the needle electrode 35 to the lower layer 36 through the upper layer 30, and then flows to the return current electrode 36 through the lower layer 31, current passes through the lower layer 31 twice. Therefore, it is possible for heat to be generated at two locations within the lower layer 31, causing poor print energy efficiency. In addition, it is possible for two dots to be printed rather than one, impairing clear print storage.

An object of the present invention is to provide a print storage medium that overcomes the disadvantages of the prior art devices by providing a needle electrode and a print storage medium having low electric conduction loss.

Further, objects of the present invention are a print storage medium having high printed dot resolution, high energy efficiency, and good durability.

SUMMARY OF THE INVENTION

These and other objects of the invention are accomplished by a print storage medium for use in a printer to produce images corresponding to an electrical picture signal supplied to a printing electrode comprising a heat generating layer adapted to be in pressure contact with the electrode for generating heat in response to the electrical picture signal supplied by the electrode, an electrically conductive layer, an ink layer melted by the heat of the heat generating layer, and a plurality of microscopic electrodes provided on the surface of the medium for contact with the printing electrode, each of the microscopic electrodes being insulated electrically from the other microscopic electrodes.

BRIEF DESCRIPTION OF THE DRAWINGS

The accompanying drawings, which are incorporated in and constitute a part of the specification, illustrate embodiments of the invention and, together with the description serve to explain the principles of the invention.

FIG. 11(*b*) is a top view of the medium of FIG. 11(a);

DETAILED DESCRIPTION OF THE INVENTION

In the present invention, a print storage medium includes a plurality of microscopic electrodes provided at least on the surface of the medium which is in contact with a print stylus electrode. The microscopic electrodes are provided to decrease contact resistance between the print stylus electrode and the print storage medium. Since the microscopic electrodes lie between the print stylus or needle electrode and the print storage medium, they decrease heat loss in the current path within the storage medium and restrain heat from being generated outside the heat generating layer.

The present invention may be applied to a print storage medium having a large number of microscopic electrodes, isolated from each other, provided at least on the surface with which a printing electrode is in pressure contact. Such print storage medium includes any storage media in which heat is generated by an electrical current and has, as basic elements, a heat generating layer that generates heat in response to an electrical picture signal, an electrically conductive layer, and an ink layer that is melted with heat generated by the heat generating layer. The print storage medium may also be of a type in which anisotropic electrically conductive material (normal to the surface of the print storage medium) is added to the heat generating layer of a print storage modem which is formed of a heat generating layer, an electrically conductive layer, and an ink layer, laminated one over the other, and having a large number of microscopic electrodes isolated from each other on the surface of the heat generating layer.

Further, the print storage medium may be of a type in which an ink release layer is provided at the interface between the electrically conductive layer and the hot-melt ink layer. The ink release layer may be made from materials that will not melt in response to heat but includes a low surface energy resin layer that will release melted ink with the aid of a difference in surface energy.

Figure 1:
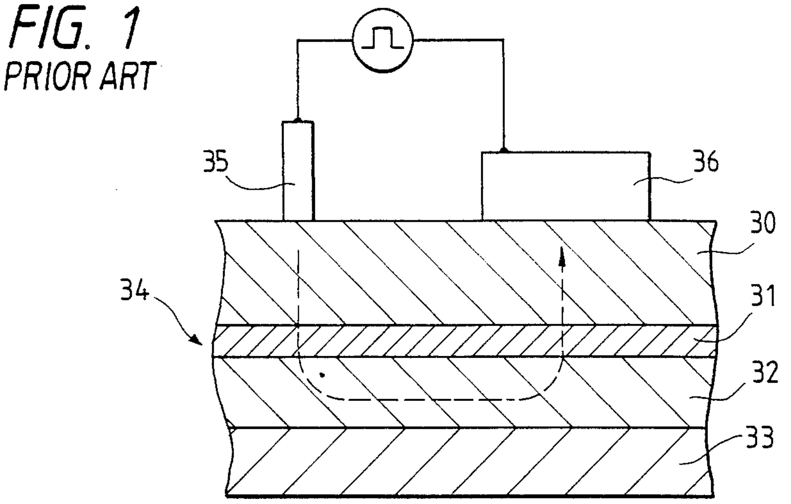
FIG. 1 PRIOR ART
FIG. 1 is a cross-sectional view of a prior art print storage medium.
Figure 2:
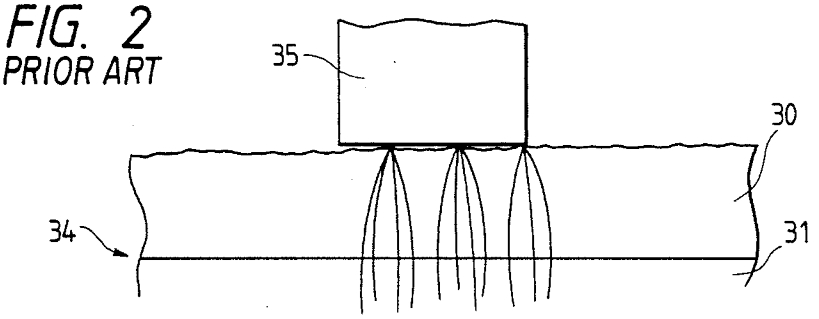
FIG. 2 PRIOR ART
FIG. 2 is a diagram for illustrating a printing operation using the storage medium of FIG. 1.
Figure 3:
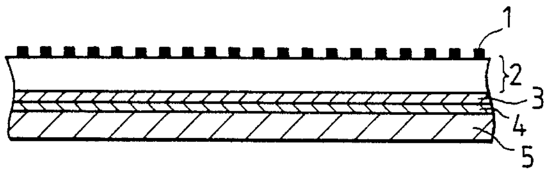
FIG. 3 is a cross-sectional view of a print storage medium of the present invention.
Figure 4:
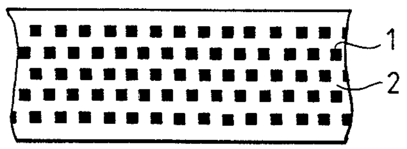
FIG. 4 is a top view of the medium of FIG. 3.
Figure 5:
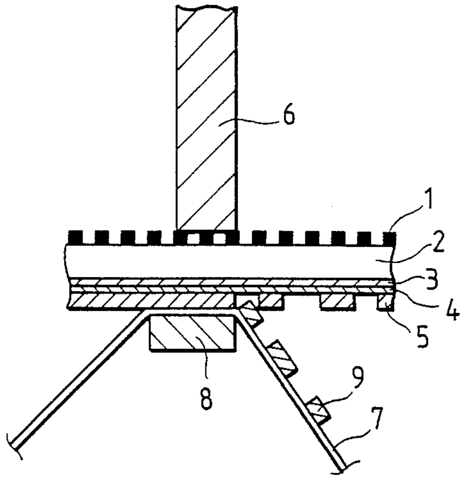
FIG. 5 is a diagram for illustrating a printing operation using the medium of FIG. 3.

Referring to FIGS. 3–5, a first embodiment of a print storage medium according to the present invention will be described. A plurality of microscopic electrodes 1 are disposed on a heat generating layer 2 as a surface layer 2 of the print storage medium. The volume resistivity of electrodes 1 is lower than that of heat generating layer 2. In a preferred embodiment of the present invention, the volume resistivity of electrodes is equal to or less than 1/50 of the volume resistivity of the heat generating layer 2. Electrode 6 makes pressure contact with electrodes 1.

Each of the microscopic electrodes 1 is electrically isolated from the others. Increasing the size of the microscopic electrodes 1 decreases both the dot transfer resolution and the energy efficiency of the print storage medium. The size of each microscopic electrode 1 should be less than or equal to the area of one of the picture-signal applying electrodes 6. In a preferred embodiment of the present invention, each microscopic electrode 1 is 80% or less, preferably 20% or less of the size of the picture-signal applying electrode 6. Square microscopic electrodes 1 may have sides of 1 to 400 μm and circular microscopic electrodes may have radii of 1 to 400 μm, and either shape of microscopic electrodes can be disposed with a pitch of 1 to 500 μm. If the area of the microscopic electrodes 1 are much smaller than that of the picture element electrodes 6, current paths can spread and become coarse leading to poor energy efficiency and poor picture quality.

Each microscopic electrode 1 should be electrically isolated from each other. Specifically, heat generating layer 2 is preferably formed of material having volume resistivity at least 50 times greater than that of microscopic electrodes 1. Insulating material or a space is provided to separate microscopic electrodes 1 and electrically isolate them from each other. The microscopic electrodes 1 may be made of electrically conductive materials including, metals such as Au, Cu, Cr, Al, Ni, Fe, Pt, Ta, W, Mo, Ti, Ag, and Zn, electrically conductive ceramics such as $RuO_2$, $Ta_2N$, TaN, TiN, ZrN, NbN, VN, $TiB_2$, $ZrB_2$, $HfB_2$, $TaB_2$, MoB, $CrB_2$, $NbB_2$, $MoB_2$, NbB, $Mo_2B$, $B_4C$, TiC, ZrC, HfC, VC, NbC, WC, TaC, and $W_2C$, or polymeric materials consisting of acetylene having electrically conductive materials dispersed therein. The resistivity of the microscopic electrodes 1 should be $10^3$ ohm-cm or less, and preferably $10^{-2}$ ohm-cm or less. The thickness of the electrodes 1 should be 40 μm or less and preferably 20 μm or less. The microscopic electrodes 1 should uniformly cover at least part of the surface of one side of the print storage medium, and the size of the electrodes 1 need not be the same. In addition, the microscopic electrodes 1 can be of any shape.

Methods of producing the microscopic electrodes include vacuum vapor deposition, sputtering, photo lithography-etching, plasma CVD, and printing. Heat generating layer 2 should have a resistivity in the range of $10^{-3}$ to $10^{3}$ ohm-cm. In a preferred embodiment, the resistivity of heat generating layer 2 should be in the range of $10^{-1}$ to $10^{2}$ ohm-cm to produce the highest print quality. Heat generating layer 2 can be made of either a film-coated composite ceramic (coated with a conductive powder of carbon) or an electrically conductive ceramic coated with a resin containing electrically conductive carbon powder. Numerous resins may be used such as polyimide resin, poly-diphenyl ether resin, polyamide resin, or polyesterimid resin. The film coating of the heat generating layer 2 should have a thickness between 1000 Å and 100 μm. A film thickness between 1 and 50 μm provides the greatest combination of mechanical strength and heat generating efficiency.

An anisotropic electrically conductive layer 3 may be provided on the side of heat-generating layer 2, opposite microscopic electrodes 1. Electrically conductive layer 3 serves as a return-path electrode for the signal applied, and can be made of an electrically conductive material such as Al, Cr, Cu, Ni, Au, Ag, Pt, Fe, Ta, W, Ti, and Mo, alloys, carbon, electrically conductive organic materials, and electrically conductive ceramics.

The thickness of return-path electrode 3 may be between 500 Å to 1 μm, but is more preferably in the range of 000 Å to 2000 Å.

An ink layer 5 is disposed below return-path electrode 3. It can be made of dye material or pigment materials such as carbon black dispersed in either a thermoplastic resin or a resin-bonding material. The resin may be either crystalline or amorphous plastic, however, it is preferred that the resin may be made of a polymeric material having a melting point of 200° C. or less and a glass transition temperature of 120° C. or less.

An ink release layer 4 is provided between an ink layer 5 and electrically conductive layer 3. Ink release layer 4 may be made from a non-melting material. If a non-melting material is used, an ink that is released due to a difference in surface energy must be used. The non-melting material is preferred since the print storage medium can be reused by replacing ink layer 5.

The critical surface tension (γo) of the preferred ink release layer 4 should be less than that of the transfer material (for example, paper, film). If an OHP film having a surface tension of approximately 42 to 45 dyn/cm is used as a transfer material, ink release layer 4 should have a surface tension of less than 35 dyn/cm. Ink release layers having low surface tension energy include fluorine resin and hard-coat film silicone resin. The silicone resin is preferred since it is best suited to forming a uniform thin layer. The thickness of ink release layer 4 should be less than 10 μm, preferably less than 1 μm.

A print storage device according to the present invention will now be described. As shown in FIG. 5, transfer material 7 is positioned between a printing electrode and a resilient pressure contacting member 8 so that individual electrically conductive microscopic electrodes 1 can contact the printing-electrode 6. A current path is formed by a picture signal input applied to printing-electrode 6. Hot-melted ink layer 5 is melted by the heat energy generated by the current causing melted ink 9 to be transferred to transfer material 7 which is in pressure contact with hot-melted ink layer 5. As a result, a picture corresponding to the picture input signal is printed on the transfer material 7.

The picture input signal may be applied to printing-electrode 6 in synchronism with the signal frequency to improve drive efficiency. Alternatively, a simple and inexpensive drive method may be employed whereby either a bias voltage is applied directly to electrically conductive layer 3 or electrically conductive layer 3 is grounded.

Figure 6:
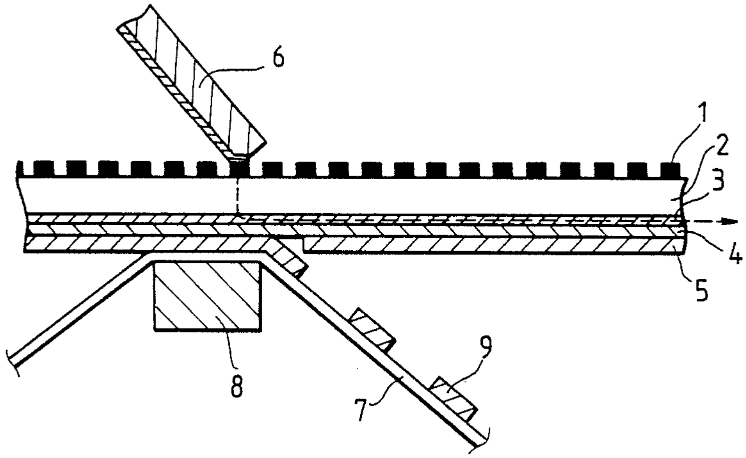
FIG. 6 is a diagram for illustrating a current flow path in the medium of FIG. 3.

Additionally, the current path of the applied electrical picture signal beyond electrically conductive layer 3 can be routed in any direction. For example, as shown by a dotted line in FIG. 6, a closed circuit is formed so that current flows from the printing electrode 6 through the electrically conductive layer 3 toward an electrode provided to be connected to the electrically conductive layer 3 on the non-printed portion of the print storage medium.

Experiment 1

A vacuum vapor deposition apparatus was used to form a 2000 Å film coating of Cu on a 25 μm thick polyimide resin sheet. The polyamide resin sheet contain 45 wt% conductive carbon. The upper surface was then dip-coated with hot-cured silicone resin to form a layer having a 0.8 μm thickness. Next, an ink release layer having critical surface tension of 31 dyn/cm was applied. OFPR photoresist liquid, marketed by Tokyo Oka Kogyo, was then applied to the lower surface using a spinner rotating at 3000 rpm. Then the polyamide resin sheet was dried for 6 minutes at a temperature of 80° C. Next, the polyamide resin sheet was exposed to a polka dot image having dots with a diameter of 20 μm and a pitch of 30 μm. The resin was developed for 3 minutes in OFPR developer, washed with water for 3 minutes, and then immersed in a 30 wt% chloride Fe solution for 2 minutes. This process caused a portion of Cu film to be etched leaving the polka dot image behind. After the polyamide resin sheet was washed with water and dried, an isolated electrically conductive pattern was placed over the entire lower surface of the sheet. An ink layer having a thickness of 6 μm was provided below the ink release layer. The ink medium was made of a heat plastic resin material containing 2 wt% azo-pigment and having a melting point of 105° C.

A stylus line-print head having a density of 8 lines/μm, each line being a square having sides of 100 μm, was driven by a signal voltage of 12 V with a 400 μs pulse width. Current was run from the stylus through the pattern of electrically-isolated microscopic conductors. A sheet of ordinary paper was pressed against the ink layer with a pressure of 600g/cm$^2$. This resulted in a printed picture having a dot diameter of 120 μm.

The aforementioned print head was then driven by a signal of voltage of 12 V with a 80 μs pulse width. The dots in the resulting transfer picture had a diameter of 170 μm.

Comparison 1

The apparatus of Experiment 1 was modified to remove the pattern of microscopic conductors. The same printing head was used and the signal voltage and pulse width remained at 12 V and 400 μs, respectively. A transfer picture was not observed.

When the head was driven by a signal of a pulse width of 800 μm at 50 V, a picture having a dot diameter of 90 μm was observed. However, due to current flow, a dent having a diameter of 30 μm was left at the portion of the ink medium in contact with the stylus.

Experiment 2

Using an electron beam vacuum vapor deposition an electrically conductive film of Cr having a thickness of 5000 Å was formed on both surfaces of a 30 μm polycarbonate sheet. Hot cured silicone resin was then coated on the upper surface of the sheet and was dried to form a 1.0 μm film. After the film dried, an ink release layer having a critical surface tension of 29 dyn/cm was formed over the film surface Using a spinner, photoresist was coated on the lower Cr surface of the polycarbonate sheet. After the photoresist dried, the sheet was exposed to a checkered pattern of electrically-isolated microscopic conductors having a 20 μm pitch and square sides having a length of 15 μm. The sheet was then developed, hardened, and etched with diluted hydrochloric acid. Finally, the sheet was washed with water and dried. This resulted in a Cr layer having a checkered pattern of electrically-isolated microscopic conductors.

An ink layer having a melting point of 95° C., a thickness of 8 μm, and an ink medium color pigment content of 3 wt%, was formed on the ink release layer.

A stylus electrode having a diameter of 45 μm and a pitch of 16 lines/mm was then pressed against the surface of the pattern of microscopic conductors. A sheet of ordinary paper was placed between the ink layer and a depressive roller having a rubber-hardness of 45. The stylus head was depressed with a pressure of 800 g/cm$^2$, and a signal having a pulse width of 500 μs and a voltage of 12 V was applied. This resulted in a transfer picture having a 70 μm dot diameter.

Effects and Advantages of the Invention

A print storage medium according to the invention has a large number of microscopic electrodes in an area where the storage medium is in pressure contact with a signal-applying electrode. The storage medium has the following advantages.

(1) Since the contact resistance between the print storage medium and the signal-applying electrode may be decreased, heat loss within both the electrode and the heat-generating layer is reduced. This leads to good print energy efficiency.

(2) Unnecessary heating of the print storage medium and the contact portions of electrodes is eliminated. Also, the current-flowing portion of the heat generating element generates heat uniformly, causing practically no thermal damage to the print storage medium.

(3) Since the amount of heat can easily be controlled by varying the amount of electrical energy applied, control of the dot print and good transfer response of the ink medium is ensured.

(4) Since unnecessary heat generation in the print storage medium will not occur, a large input signal may be applied with a short pulse, permitting high speed printing.

A second embodiment of the present invention will now be described. The second embodiment is characterized in that the electrically conductive layer is divided into stripes.

In the second embodiment, the print storage medium comprises a heat generating layer for generating heat in response to an input of an electrical signal, an electrically conductive layer, and an ink layer, that is melted by heat generated in the heat generating layer. The second embodiment is also characterized by a large number of microscopic electrodes isolated from each other and disposed on the surface of the print storage medium. The microscopic electrodes are in pressure contact with a print storage electrode, and the electrically conductive layer is divided into a plurality of striped return electrodes.

In the print storage medium according to the present invention, an ink release layer may be provided between the ink layer and the electrically conductive layer.

Figure 7:
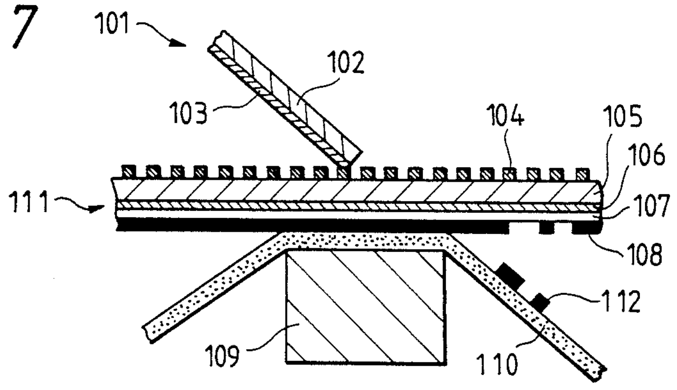
FIG. 7 is a diagram illustrating a printing operation using a print storage medium in accordance with a second embodiment of the invention.

The operation of the second embodiment will now be described with reference to FIG. 7. Stylus electrode head 101 provided with electrode layer 103 on head support 102 is in slidable pressure contact with print storage medium 111. Print storage medium 111 includes microscopic electrodes 104 formed on the surface of heat generating layer 105, an electrically conductive layer formed of stripe return electrodes 106, ink release layer 107, and ink layer 108. Heat generated by stylus electrode current flowing through the microscopic electrodes 104 to the heat generating layer 105, melts the ink layer 108 causing ink 112 to be transferred onto paper 110 positioned on pressing member 109.

Signal electrode 101, in pressure contact with the print storage medium, allows current to flow through heat generating layer 105. Heat-generating layer 105 has a much lower interior electrical resistance than surface resistance, causing heat generation at a location immediately beneath the needle-like signal electrode 101. Applying pulses in synchronism with the signal pulse to return electrode 106 or applying a bias voltage ensures that signal pulses are used efficiently. In this embodiment, since the electrically conductive layer is formed of striped return electrodes 106 in the shape of stripes, the heat will not radiate laterally. Therefore, this arrangement serves to retard spreading of print dots and to minimize energy loss. Striped return electrodes 106 are formed using a chemical or dry etching photolithography process and preferably have a pitch within the range of several microns to the tens of milimeters. To minimize current and heat diffusion, the width and pitch of the striped return electrodes 106 should be equal to that of signal-electrode 101. In addition, applying a voltage to the current return path serves to prevent adverse effects to other processes. The heat generated within heat generating layer 105 transfers across ink release layer 107, to heat the ink layer 108 to soften the ink. As a result, an ink picture 112 is transferred to transfer material 110.

Figure 8:
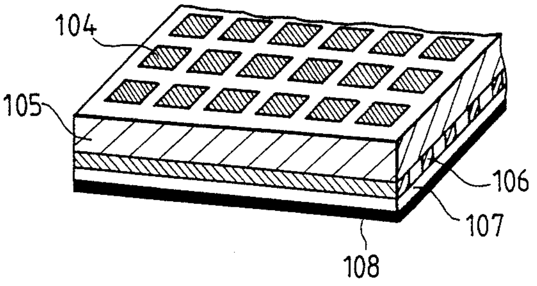
FIG. 8 is a perspective view of a second embodiment of the print storage medium of the invention.

FIG. 8 is a perspective view of a print storage medium according to the second embodiment. A large number of microscopic electrodes 104 electrically isolated from each other are disposed on the exposed surface of the heat generating layer 105. An electrically conductive layer having striped return electrodes 106 is provided on the other side of the heat generating layer 105. An ink release layer 107 is sandwiched between electrically conductive layer 106 and the ink layer 108.

Figure 9A:
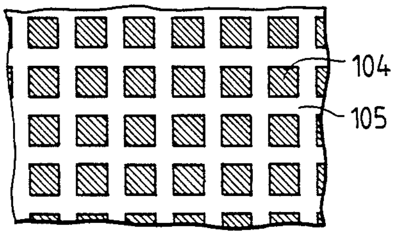
FIGS. 9(*a*) and 9(*b*) are diagrams illustrating embodiments of microscopic electrodes in the medium of FIG. 8.
Figure 9B:
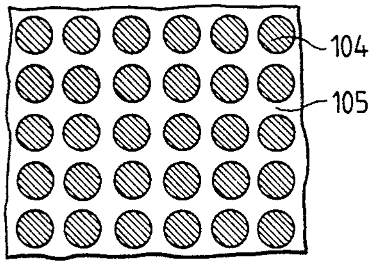

Microscopic electrodes 104 on the surface of the print storage medium 111 may be of any shape. For example, in FIG. 9(*a*) the microscopic electrodes 104 are square and in FIG. 9(*b*), they are circular.

In a preferred embodiment, microscopic electrodes 104 are provided uniformly over the entire surface of one side of the print storage medium, however, they may be arranged to cover only part of the surface. In addition, the size of respective electrodes 104 may be the same or may be different. The thickness of microscopic electrodes 104 should be between 500 Å to 30 μm, preferably between 1000 Å to 5 μm.

Generally, the area of the respective microscopic electrodes 104 should be determined based upon picture resolution and energy efficiency requirements. However, the area should be less than or equal to that of one of the signal electrodes 101. Specifically, the respective microscopic electrodes 104 are formed to have a pitch of 1 μm to 500 μm, preferably 10 μm to 120 μm, and a circular shape having a diameter of 1 μm to 400 μm.

Microscopic electrodes 104 should also be isolated from each other electrically. In order to isolate electrodes 104 from each other, the area around each electrode 104 preferably has a resistivity 100 times or more as large as that of the microscopic electrodes 104. Space should be provided between signal electrode 101 to electrically isolate them from each other. In addition, an insulating material may be provided between microelectrodes 104 to further electrically isolate them from each other. The volume resistivity of the respective microscopic electrodes 104 must be less than the volume resistivity of the heat-generating layer 105. It is preferred that the volume resistivity of micro-electrodes 104 be 1/100 or less of the volume resistivity of the heat-generating layer 105.

The microscopic electrodes 104 may be made of electrically conductive metals such as Ni, Cu, Cr, Sn, Ta, Ti, Zn, Au, Ag, Fe, A1, and Pt; electrically conductive ceramics such as $RuO_2$, SiC, WC, $MoSiO_2$, and TiC; polyacetylene; and polymeric materials containing electrically conductive materials. The resistivity of microscopic electrodes 104 should be $10^{-3}$ ohm-cm or less and preferably $10^{-2}$ ohm-cm or less.

The microscopic electrodes according to the invention may be formed through methods such as vacuum deposition, sputtering, photolithographic etching, plasma CVD, and printing.

In accordance with the invention, the heat generating layer 105 also serves as a support member for the print storage medium. Heat generating layer 105 is in the form of a plate or a belt having a thickness of 0.5 to 50 μm and a resistivity of $10^{-3}$ to $10^{3}$ ohm-cm, preferably $10^{-1}$ to $10^{2}$ ohm-cm. Heat generating layer 105 can be formed of materials including carbon-dispersed heat-resistive resins (polyimide, polyamide, silicone resin, fluorine resin, and epoxy resin etc.), electrically conductive films such as electrically conductive polyamide film, electrically conductive polyester film, electrically conductive carbonate film, electrically conductive carbon-containing ceramics, and metal powder-containing ceramics.

In addition, an anisotropic conductive layer may be formed on heat generating layer 105 over which microscopic electrodes 104 may be provided.

According to the present invention, electrically conductive layer 106 serves as a return electrode and is formed in the shape of stripes.

Striped electrodes 106 can be made of metal film and should have a thickness between 1000 Å and 1 μm, a resistivity between $10^{-2}$ and $10^{-6}$ ohm-cm, and a width larger than or equal to the width of print microscopic electrodes 104.

Striped electrodes 106 are constructed through a process of photolithography whereby a metal film (one of or alloys of Ni, Cu, Cr, Au, Ag, Fe, Zn, Ta, Ti, Sn, Al, Pt), is provided with a resist layer and then etched to form stripes having a pitch of between 1 μm and 10 mm, preferably 10 to 200 μm.

The ink layer 108 may be made of a dye or pigment dispersed in either a thermoplastic resin or a resin type bonding material. A heat plastic type or a crystaline or amorphous type resin material may be used. It is preferred that a polymetric material is used, having a melting point of 150° C. or less, a glass transition temperature of 100° C. or less, and a mixture or dispersion of color material of 30 wt% or less. The thickness of the ink layer 108 should be between 1 and 30 μm.

In the second embodiment, the ink release layer 107 is preferably provided between the ink layer 108 and the electrically conductive layer 106. Ink release layer 107 may be made of a material such as a low surface energy type resin layer that will not melt when heated but will release ink that is melted due to a difference in surface energy.

Transfer material 110 should have a surface tension (γc) less than 35 dyn/cm, and the surface tension (γc) of ink release layer 107 should be less than that of transfer material 110. Ink release layer 107 may be made of hard coated films including fluorine resin, silicone resin, or organic plasma polymeric films. A thin ink release layer 107 is preferred and the thickness should be less than 10 μm, preferably in the range of 1000 Å μm.

The following experiments were performed with variations of a print storage medium according to the second embodiment of the invention.

Experiment 1

Using a method of vacuum deposition at a substrate-heating temperature of 200° C., a 3000 Å deposit of Cu was formed on a 28 μm thick polyamide film containing carbon and having a resistivity of 10 ohm-cm. Next, a resist pattern of squares having a pitch of 40 μm and sides of 30 μm was provided over the entire surface of the film through a photoresist method. The film was then etched in a solution of ferric chloride to form a pattern of isolated electrically conductive squares. On the opposite surface of the film, a 1000 Å layer of Al was formed. A photoresist method was used to form stripes having a pitch of 62.5 μm and a width of 45 μm. The stripe pattern was then etched in sodium hydroxide to form stripe return electrodes.

Thereafter, hot-cured type silicone resin was coated on the return electrodes using a spin coater. The resin was hot-cured at 200° C. to form a 0.8 μm thick ink release layer. The surface tension of the ink release layer (calculated by a Zisman plot based upon measurement of the contact angle) was 29 dyn/cm.

Figure 10:
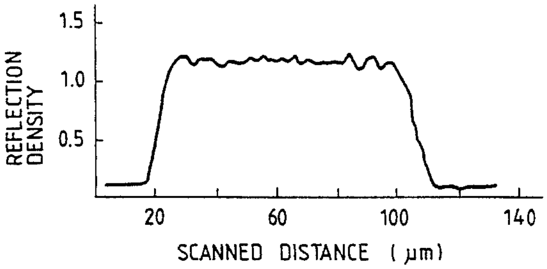
FIG. 10 is a graph showing a relationship between optical depth of transferred dots versus scanned distance in accordance with printing with the medium of the present invention.

Next, a 5 μm thick ink layer consisting of a color polyester resin with a melting point of 95° C. was formed. A line-needle-like electrode having a density of 16 lines/mm, an electrode width of 50 μm, and a width of 200 mm was urged against the isolated conductor pattern layer at a contact pressure of 200 g/cm² and was then driven by pulses of 100 μs width, 12 V. The print storage medium was then run at a line speed of 250 mm/sec, resulting in a transfer picture of 55 μm by 80 μm on an ordinary sheet of paper. FIG. 10 shows the optical density (reflection density) of the dot picture measured using a microdensitometer.

Experiment 2

A 4000 Å thick layer of cr was coated on one side of a sheet of polycarbonate film. The polycarbonate film had a thickness of 50 μm, contained electrically conductive carbon, and had a resistivity of 50 ohm-cm. A circular resist pattern having a 20 μm pitch and a 15 μm resist diameter was then provided over the entire surface of the film. Thereafter, the polycarbonate film was etched in hydrochloric acid to form an isolated electrically conductive pattern. Subsequently, an Ni film having a thickness of 2000 Å was formed on the polycarbonate film through a sputtering method. The film was subjected to dry-etching by oxygen plasma to obtain a striped pattern. To complete the print storage medium, the ink release layer and ink layer were formed in a similar manner to the first embodiment. When printing was performed on a sheet of ordinary paper using a line needle electrode having an electrode width of 100 $\mu m$, a density of 8 lines/mm and a width of 150 $\mu m$, in pressure contact with the paper under a pressure of 100 $g/cm^2$, a square transfer dot picture of 120 $\mu m$ by 130 $\mu m$ was obtained.

Comparison 1

A print storage medium was made in a similar manner to that of the first embodiment except that the return electrode layer was formed as a uniform film rather than a striped pattern. A print experiment was conducted using this print storage medium. The print experiment which took place under the same conditions as the first embodiment did not result in any transfer of a dot picture. When a signal having a drive voltage of 18 V and a pulse width of 150 $\mu s$ has used, a transfer dot picture of 87 $\mu m$ by 93 $\mu m$ was obtained.

Comparison 2

A print storage medium was made in a similar manner to the first embodiment except that the isolated electrical conductor pattern was not formed. A print experiment was conducted in a similar manner to that of the first embodiment and no picture transfer was observed. A transfer dot picture of 67 $\mu m$ by 70 $\mu m$ was obtained under a contact pressure of 500 $g/cm^2$, with a signal having a voltage of 29 V and a pulse width of 50 $\mu s$.

Effects and Advantages of the Second Embodiment

1. Heat is Generated With Minimal Heat Diffusion

Since the return electrodes are striped, the heat will not diffuse laterally. Thus, diffusion of dots will be restrained and energy loss will be minimized.

2. High Speed Printing Is Possible

The heat conduction distance between the heat generating layer and the ink is as close as 1 $\mu m$, therefore, the printing time constant is small. This improves high speed response. Additionally, signal application to the heat generating layer is effected by means of current, which will not cause a significant time delay. The time delay per dot is less than 10 $\mu s$.

3. A High Quality Picture Is Obtained

Ink materials having the required heat plastic properties can easily be obtained from transparent polymeric materials as well as suitable colored materials. The color tone margin is therefore high and high quality color can be reproduced. Since color material is contained within the polymeric dissolution due to oxidation or reduction, everlasting color pictures can be obtained. The color picture is as good as that of electronic photography or ink printing. Color tone can be improved using a wide selection of color materials.

4. High Gradation Can Be Obtained

Since response to the input signal is good, the amount of ink transferred can be adjusted by modulating the input signal. This enables area modulation of dots. While reproduction of mid-gradation has been insufficient in prior art, this invention overcomes drawbacks of matrix modulation. In addition, multi-gradation dot modulation can be implemented with high picture quality, leading to print quality and color mid-gradation reproduction as good as that of ordinary printing. Picture elements of 8 to 16 dots/mm can produce 4 to 16 gradations per picture element.

5. High Energy Efficiency Printing Is Possible

Since the heat generating layer is close to the ink layer, heat loss due to diffusion is minimized when the signal is applied. Also, there is minimal heat loss due to resistance in the signal input circuit, since the pattern return electrodes, around which the electrically conductive layer is formed permits the thickness of the layer to be large, thereby reducing heat loss due to current flow to the return electrodes. Since the signal current flows through the heat generating layer only once, heat loss will be ½ that of prior art devices in which the signal electrode and the return electrodes are on the same side. In other words, an energy of 1000 oerg/dot enables printing wherein one dot consists of 8 lines/mm.

6. Other Effects and Advantages

Providing an ink release layer improves not only the reliability of ink transfer rate but also the input energy efficiency and the response of the ink-transfer to the input energy. The ink release layer also makes possible dot modulation of the ink-transfer picture.

A third embodiment of the invention will now be described. This embodiment is characterized by microscopic electrodes made of electrically conductive ceramics.

The third embodiment is for a print storage medium comprising a heat generating layer for generating heat in response to an electrical picture, an electrically conductive layer, an ink release layer, and an ink layer, one placed over the other, characterized in that the microscopic isolated pattern formed on the surface of the heat generating layer is made of electrically conductive ceramics.

Figure 12:
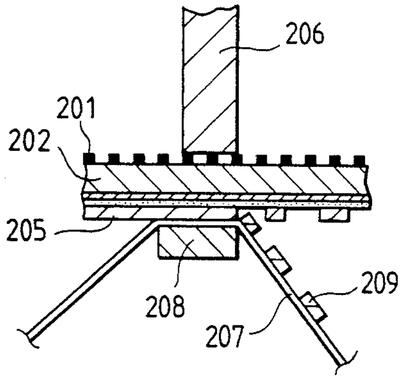
FIG. 12 is a diagram illustrating a printing operation using the medium of FIG. 11(*a*)

The operation of the third embodiment will be described with reference to FIG. 12. FIG. 12 is a diagram illustrating a print storage medium according to the present invention. Needle-like printing electrode 206 is in slidable pressure contact with the print storage medium. The print storage medium is formed of heat generating layer 202 provided with a surface layer of microscopic electrically-isolated electrodes 201 made of electrically conductive ceramics. The print storage medium also includes return electrode 203, ink release layer 204, and ink layer 205. In response to the electrical signal from needle-like electrode 206, current flows from the microscopic electrodes 201 through heat generating layer 202 to generate heat from microscopic isolated electrodes pattern 201. The heat generated melts the ink layer and is transferred onto a sheet of transfer paper 207, which is held against the ink layer 205 by resilient pressure-contacting member 208, causing ink images 209 to form on paper 207.

The followings are possible current-flow paths and heat conduction routes of this embodiment.

1. Current paths signal drive circuit→needle-like print electrode →electrically-isolated conductive ceramic microscopic electrical pattern →heat generating layer→return electrode (drive circuit) ground.

2. Heat conduction routes heat generating layer →return electrode→ink release layer→ink layer.

Since the heat-generating layer is provided with the microscopic electrodes formed of electrically conductive ceramics, the high heat-resistance and hardness of the ceramic can eliminate damage and scratches due to mechanical sliding of the storage medium. This damage would otherwise occur due to heat generated at the contact points between the needle-like print electrode and the print storage medium. Even after multiple uses of the third embodiment at high speeds, changes in the print storage medium are remarkably minimal. Additionally, the conductivity of the ceramic decreases the contact resistance between the needle-like print electrode and the print storage medium and reduces heat energy loss in the heat generating circuit. As a result, energy efficiency per print dot is improved. Also, the reduction in damage to the surface of the print storage medium extends the life of the print storage medium.

Figure 11A:
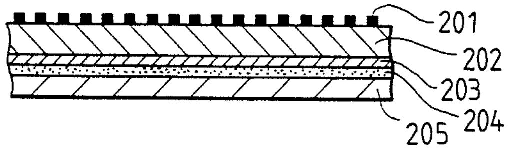
FIG. 11(*a*) is a cross-sectional view of a print storage medium in accordance with a third embodiment of the present invention.
Figure 11B:
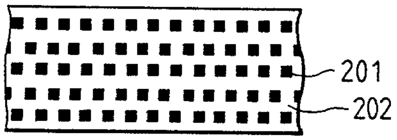

The third embodiment will now be described with reference to the drawings. In accordance with the invention, FIG. 11(*a*) is a general cross-sectional view of a print storage medium and FIG. 11(*b*) is a top view. A microscopic electrode pattern 201 is formed of electrically conductive ceramics on the surface of the heat generating layer 202. This microscopic electrode pattern 201 may have a volume resistivity of 1/100 or less of that of heat generating layer 209. The cross-sectional area of the microscopic isolated electrode pattern is 4/5 or less that of one signal applying electrodes, and preferably ½ or less. If the cross-sectional area of the signal applying electrodes is much smaller than that of the microscopic electrodes, dot transfer precision becomes poor, and current flux through the heat generating layer will be coarse and diffused, thereby reducing energy efficiency. Also, the clarity of dots becomes poor significantly impairing the quality of the picture.

The microscopic electrodes made of electrically conductive ceramics are formed of heat resistive conductive ceramics, and should have a melting point of 1500 ° C. or more and should be formed of one of, or a combination of, oxide, nitride, boride, silicide and carbonates having a resistivity of not greater than $10^2$ ohm-cm, preferably not greater than $10^{-3}$ ohm-cm. These heat resistive ceramics include, specifically, $V0_2$, $RuO_2$, TaN, $Ta_2N$, ZrN, NbN, VN, $TiB_2$, $ZrB_2$, $HfB_2$, $TaB_2$, $MoB_2$, $CrB_2$, $NbB_2$, MoB, NbB, $UB_2$, $MO_2B$, $B_4C$, TiC, ZrC, HfC, VC, NbC, WC, $W_2C$, TaC, $MoSiO_2$, $TaSi_2$, and $WSi_2$.

Figure 13:
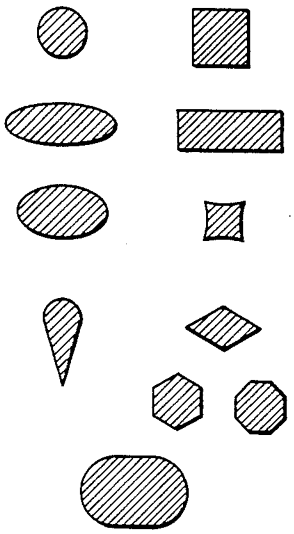
FIG. 13 is a diagram illustrating the shape of a microscopic electrode pattern usable in the medium of FIG. 11(*a*)

The microscopic electrodes should have a thickness of less than 40 μm, more preferably less than 1 μm. Also, the microscopic electrodes are not limited to a particular shape. FIG. 13 shows examples of various shapes of microscopic isolated electrode patterns. Examples of methods for producing the microscopic isolated electrode patterns are a photoresist method, a dry etching method, or a mask method.

According to the invention, the heat generating layer 202 is formed of materials having a resistivity of $10^{-3}$ to $10^3$ ohm-cm, and preferably in the range of $10^{-1}$ to $10^2$ ohm-cm. The heat generating layer 202 requires a heat resistivity of 200° C.

Specifically, the heat generating layer 202 may be made of materials wherein carbon powder, metal powder, electrically conductive ceramic powder, etc., are dispersed in materials such as polyamide resin, polyester resin, silicone resin, epoxy resin, poly-diphenyl ether resin, polyamid resin or polyesterimid resin. Different combinations may be used in order to adjust electrical resistance of the layer. In addition, the heat-generating layer may be formed through physical film coating, i.e., compound metal and compound ceramics.

The thickness of the heat generating layer should be in the range of 1000 Å to 100 μμm. A thickness of 1 to 50 μm is preferred in that it produces the highest running speed and heat generation efficiency.

The electrically conductive layer or return electrodes 203 of the print storage medium according to the invention should preferably be formed of electrically conductive materials, such as metals (Al, Cu, Cr, Ni, Au, Ag, Pt, Fe and alloys of these), carbon, electrically conductive ceramics, and electrically conductive organic substances. The return electrodes should have a thickness of between 500 Å and 10 μm, preferably in the range of 2000 Å to 1 μm.

The ink release layer 204 disposed below the return electrodes 203 has a surface of a critical surface tension (γc) lower than that of the transfer material (paper, film etc.), preferably less than 38 dyn/cm. This layer also serves to protect the return electrode layer. The thickness of the ink release layer should be 10 μm or less, preferably 1 μm or less.

The ink layer 205 is formed of known thermoplastic resin. The most convenient materials are those in which a major ingredient is a polymeric material having a melting point of 200° C. or less, a glass transition temperature of 120° C. or less, and having color materials for dying mixed, dispersed, or dissolved therein.

The drive efficiency of the picture signal that is input to the signal applying electrode, will be better if it is applied to the return electrode in synchronism with the signal frequency.

In terms of signal circuit design and cost, either applying DC bias voltage directly to the return electrodes or grounding the return electrodes is an efficient driving method.

Additional experiments conducted with the third embodiment will now be described.

Experiment 1

A 3000 Å thick $Ta_2N$ layer was formed through a sputtering film coating method on one side of a polyamide resin film (30 μm thick, a resistivity of 20 ohm-cm). The resin film was provided with electrical conductivity by dispersing carbon particles therein. A photoresist solution (OFPR 30 cp by Tokyo OKA KOGYO) was applied on the thin ceramic film using a spinner rotating at 1500 rpm, and was subsequently dried for 10 minutes at 80° C. An electrically-isolated microscopic electrode pattern of polka dots having a diameter of 10 μm and a pitch of 20 μm was provided over the entire surface of the photoresist film by exposing the film to a high voltage mercury lamp for 20 seconds and then developing it for 3 minutes in a solution for OFPR. The photoresist film was then washed well and was dried at 100° C. for 10 minutes. Next, the film was immersed in an etching solution at 70° C. The etching solution was made by diluting a 1:4:3 solution of boracic acid, nitric acid, and acetic acid (all first class reagents) with 4 parts water. This solution applied to the photoresist layer etched the $Ta_2N$. The etched $Ta_2N$ was then washed away leaving a polka dot microscopic isolated pattern. Using a method of vacuum deposition, a 1500 Å thick layer of Al was deposited on the other side of the film. Then a dipping method was used to form a 0.7 μm thick layer of hot cured type silicone resin deposited through a dipping method forming an ink release layer having a critical surface tension of 30 dyn/cm. A 7 μm thick ink layer containing 3 wt% azo pigment dispersed in a heat plastic resin was provided beneath the ink release layer. The azo pigment had a melting point of 95° C.

Using a stylus line head having a picture element density of 8 lines/mm and sides of 60 μm, a 12 V signal voltage with a pulse width 300 μs, was applied to the metal portion of the stylus line head. The stylus line head was in pressure contact with the pattern side of print storage medium. A high quality paper was placed against the print storage medium with a pressure of 300 $g/cm^2$. The resulting ink transfer was good with dots having a somewhat rounded-square shape. The sides of the squares were 110 μm. When a 12 volt dot signal with a pulse width of 900 μs was applied, the transferred dots had a diameter of 190 μm.

After the two tests mentioned above were complete, the surface of the microscopic electrodes were examined under a microscope. No damage was observed. Since the printing process caused portions of ink on the ink layer to be transferred onto the paper, additional ink was added to the empty areas of the ink layer. The print cycle was then repeated. After 100 print cycles, transfer picture quality and energy use was similar to that of the initial print cycle.

Comparison 1

As in the experiments conducted on the first embodiment, the print storage medium was modified to remove the microscopic electrodes. The following are the results of experiments performed with the modified print storage medium:

(1) A signal having a pulse width of 300 μs, and a voltage of 12 V did not cause transfer of ink picture.

(2) A signal having a pulse width of 900 μs and a voltage of 12 V produced round dot pictures having a diameter of 100 μm. After the first printing cycle, that portion of the print storage medium in contact with the stylus electrode was damaged due to heat.

Experiment 2

A sputtering process was used to form a 5000 Å thick film of $ZrB_2$ on one side of a 45 μm electrically conductive polyamide film. The polyamide film contained carbon and had a resistivity of 10 ohm-cm. Next, a photoresist solution (OFPR 30 cp available from Tokyo Oka Kogyo) was applied to the ceramic film using a spinner rotating at 2000 rpm. The film was subsequently dried for 10 minutes at 80° C. A pattern of square microscopic electrodes having a of pitch 25 μm and square sides of 15 μm was exposed to a high voltage mercury lamp for 20 seconds. The exposure was then developed for 5 minutes in a developing solution of OFPR, washed, dried, and cured for 15 minutes at 105° C. The ceramic film was then placed in $3X10^{-3}$ Torr argon gas and exposed to an RF glow discharge of at 0.5 kw for 20 minutes. This method of dry etching resulted in a film having a pattern of electrically-isolated microscopic electrodes.

A 2000 Å A thick layer was deposited on the other side of the film. Then a 0.5 μm thick layer of hot cured silicone resin having a critical surface tension (γc) of 33 dyn/cm was coated on the Al layer. Finally, an ink material layer made of a heat plastic resin mixed with 2 wt% pigment was added to the print storage medium. The heat plastic resin had a fusion point of 95° C. and the ink layer, similar to the one in experiment 1, had a thickness of 4 μm.

A printing experiment was conducted with this print storage medium, using an apparatus similar to that used in the experiment 1. The resulting print had a good circular dot image with diameter of 105 μm. This image was produced with a signal having a pulse width of 200 μs and a voltage of 15 V.

Printing was repeated 50 times, and no damage was observed on the microscopic isolated pattern of the print storage medium.

Advantage of the third embodiment

A print storage medium according to the third embodiment has the following advantages. (1) High speed printing is possible.

The pattern microscopic electrodes formed of electrically conductive ceramics has good heat resistive properties, preventing heat damage to the contact point of the print storage medium and the printing needle electrode. Also, heat shock is prevented resulting in a decrease in the chemical combination of the surface layer with air. As a result, even after repetitive printing at high speeds, the physical properties of the print storage medium will not change. Finally, the ability to use a high rate of pulse energy per unit dot permits the use of narrow pulses and leads to high speed printing.

(2) Print energy efficiency is high.

The decreased contact resistance between the printing needle electrode and the print storage medium reduces energy loss due to heat generated in areas other than the heat generating layer. Therefore, energy efficiency per dot is improved.

In a conventional print storage medium in which the heat generating layer is in direct contact with the needle electrode, there is typically a high contact resistance. A large amount of heat generated at the contact point is transferred to the printing needle electrode, decreasing the amount of energy actually used for melting the ink. In the conventional print storage medium, the distance from the major heat-generating area to the ink layer is much greater than that of the present invention wherein the heat generating layer is the major heat generating area. Therefore, the heat conduction efficiency of these prior art devices is poor. In contrast, use of microscopic electrodes made from electrically conductive ceramics such as those of the third embodiment eliminates considerable heat diffusion. Therefore, the energy efficiency is several tens of times higher than that of the conventional print storage medium.

(3) The life time of the print storage medium is longer.

Since the microscopic isolated pattern is formed of conductive ceramics, the contact resistance between the print storage medium and the printing needle electrode is decreased. This eliminates damage to the surface of the print storage medium. While metals will form oxides due to discharged heat or contact resistance, this will not occur with electrically conductive ceramics. Therefore, electrical resistance and physical properties will be constant over the entire surface layer, increasing the life of the print storage medium.

(4) High quality pictures can be obtained.

Since the ink release layer and the ink layer are provided beneath the heat-generating and return electrode layers, various color materials can be used without electrically interfering with the print storage medium. Also, the ink layer, which is affected only by heat generated from the heat generating layer, exhibits very good ink transfer response. Therefore, high quality, durable color pictures with high gradation can be produced.

A fourth embodiment will now be described. The fourth embodiment is characterized in that the electrically-isolated microscopic electrode pattern is formed of electrically conductive resin. In the fourth embodiment, current passing through the heat-generating layer creates heat that is transferred to an electrically conductive layer and an ink layer on the surface below the heat generating layer. The fourth embodiment is characterized by a large number of electrodes formed of resin and each of which is electrically isolated from the other. This embodiment provides improved mechanical strength of the microscopic electrodes. Further, the microscopic electrodes can be easily formed on the front surface of the heat generating layer through a number of methods including printing, enabling low cost production of the print storage medium.

Figure 14:
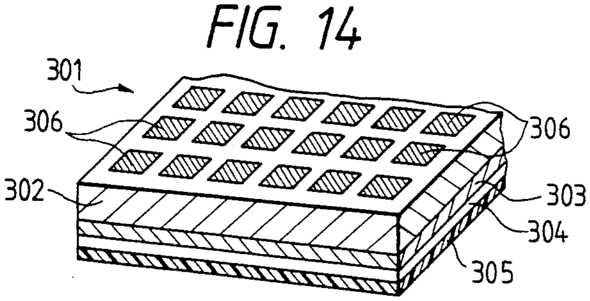
FIG. 14 is a cross-sectional perspective view of a fourth embodiment of the print storage medium of the present invention.

FIG. 14 shows the fourth embodiment of a print storage medium according to the invention. As depicted in FIG. 14, print storage medium 301 includes heat generating layer 302, electrically conductive layer 303, ink release layer 304, and ink layer 305 placed one over the other in the previously recited order. A large number of electrically-isolated microscopic electrodes 306 are provided on the front surface of heat generating layer 302. Heat generating layer 302 is a thin film, which generates heat in response to the flow of electric current and should have a resistivity in the range of $10^{-2}$ to $10^{3}$ ohm-cm, preferably $10^{-1}$ to $10^{2}$ ohm-cm for good quality printing. Also, the heat resistance of heat generating layer 302 should be 200° C. or more, and preferably 300° C. or more.

Specific materials for heat generating layer 302 include those in which carbon powder, metal powder, or electrically conductive ceramic powder is dispersed in polyamide resin, polyester resin, silicone resin, epoxy resin, poly-diphenyl ether resin, polyamidee resin, or polyester imide resin. Heat generating layer 302 may also be constructed of coated composite metals or composite ceramics. The thickness of heat generating layer 302 should be in the range of 1000 Å to 100 μm, however, in order to maximize mechanical strength and heat generating efficiency, the thickness should be preferably in the range of 1 to 55 μm.

Conductive layer 303 functions as a return electrode for an applied signal, and may be formed of electrically conductive metals such as Al, Cu, Cr, Ni, Au, Ag, Pt, and Fe, alloys of these metals, carbon, electrically conductive ceramics, or electrically conductive organic materials. The thickness of return electrode 303 should be 500 Å to 10 μm, and preferably in the range of 2000 Å to 1 μm.

The ink release layer 304 laminated under electrically conductive layer 303 allows ink layer 305 to be easily released from print storage medium 301 when heat generating layer 302 generates heat. This permits precision printing. The ink release layer 304 should be made of a resin having a low surface energy to allow the ink to be melted without melting any of the other print storage medium layers. This permits the ink layer to be refilled and the print storage medium 307 to be reused.

The ink release layer 304 which also serves to protect return electrode layer 303, must have a critical surface tension (γc) lower than that of papers or films, preferably less than 37 dyn/cm.

Low surface energy materials for forming ink release layer 304 include materials such as fluorine resin and silicone resin. Silicone resin is particularly preferred since it allows for easy production of uniform thin film.

Ink layer 305 is formed of ink in a laminar fashion. Ink layer 305 may be made of a material in which a known dye or pigment, such as carbon black, is dispersed in a wax or resin bonding material. The resin used may have thermal plastic characteristics and may be either crystalline or amorphous in structure. The major component of the ink layer 305 should preferably be a polymer material having a melting point of 200° C. or less and a glass transition temperature of 120° C. or less.

A large number of electrically-isolated electrodes 306 are formed on the surface of heat generating layer 302. These elements 306 are formed of resin and are provided with electrical conductivity. Elements 306 make electrical contact with the printing electrode to allow current to flow through heat generating layer 302. Current will only flow through those areas of the surface layer that are provided with the electrodes 306.

Microscopic electrodes 306, may have a resistivity not larger than 1/10 that of the heat generating layer 302. Specifically, the resistivity of the microscopic electrodes 306, should be less than $10^{2}$ ohm-cm, and preferably less than $10^{-2}$ ohm-cm. Microscopic electrodes 306 may be made from resin materials in which carbon powder, metal powder, or electrically conductive ceramics are dispersed. The type and amount of dispersed material can be selected to adjust electrical resistance to the values described above. Resin materials that may be used include polyamide resin, polyester resin, silicon resin, epoxy resin, poly diphenyl ether resin, polyamide imide resin and polyesterimide resin.

Figure 15:
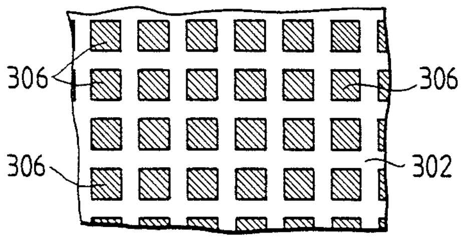
FIG. 15 and FIG. 16 are top views of the heat generating layer showing different patterns of microscopic electrically conductive elements.
Figure 16:
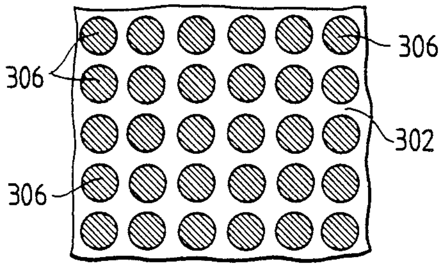

The thickness of the microscopic electrodes 306 should be 100 μm or less, and preferably in the range of 0.5 to 50 μm. The microscopic electrodes 306 may be arranged so that planar squares as shown in FIG. 14 or planar circles as shown in FIG. 15 are regularly disposed laterally and longitudinally with a predetermined space between rows. However, the shape of the microscopic electrodes is not limited to these shapes and may be arbitrary shapes such as rectangles, triangles, or ellipses.

The size of the microscopic electrodes 306 should be not greater than 80% and preferably not greater than 25% that of the conductive picture elements of the previously described print storage electrode. If each microscopic electrode 306 is larger than 80% of that of the conductive picture element of the print storage electrode, dot transfer is impaired. In addition, if the microscopic electrodes are too large, two print electrodes may simultaneously contact one electrode 306 which may make printing impossible.

It is most practical for the electrically-isolated microscopic electrodes to be made up of squares or circles having sides or diameters of 1 to 150 μm. The most convenient size for the sides or diameters is 40 μm. The microscopic electrodes 306 should cover 20 to 80% of the surface of the heat generating layer 302. Most preferably, 50 to 70% of the heat generating layer 302 should be covered.

As the size of the microscopic electrodes 306 decreases, production becomes more difficult and manufacturing costs become higher. Also, if the area occupied by the microscopic electrodes 306 is too small as compared to the area of the heat generating layer 302, then the density of current flowing through the heat generating layer 302 will be too high, causing uneven heat generation. On the other hand, if the area occupied by the microscopic electrodes 306 is too large, they will be positioned too closely together. This will cause signal current to leak to adjacent microscopic electrodes 306 impairing printing resolution and reliability.

Microscopic electrodes 306 can be formed using various printing methods such as screen printing, gravure printing, or direct depiction wherein the elements are depicted directly on the surface of the heat generating layer 302 with a piece of material such as a thin wire. Specific printing methods are selected depending on the pattern required.

Screen printing is a simple and low cost method of forming the required microscopic electrodes. In the gravure printing method, recessed portions of the required pattern are formed on the surface of a metal plate. Using the metal plate, materials for forming the microscopic electrodes are deposited onto the surface of the heat generating layer 302, to produce the required pattern of microscopic electrodes 306. This method is highly precise.

Figure 17:
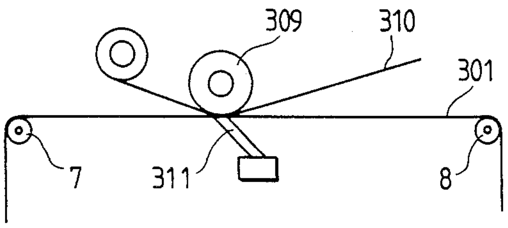
FIG. 17 is a diagram showing an arrangement of a device for performing print storage.
Figure 18:
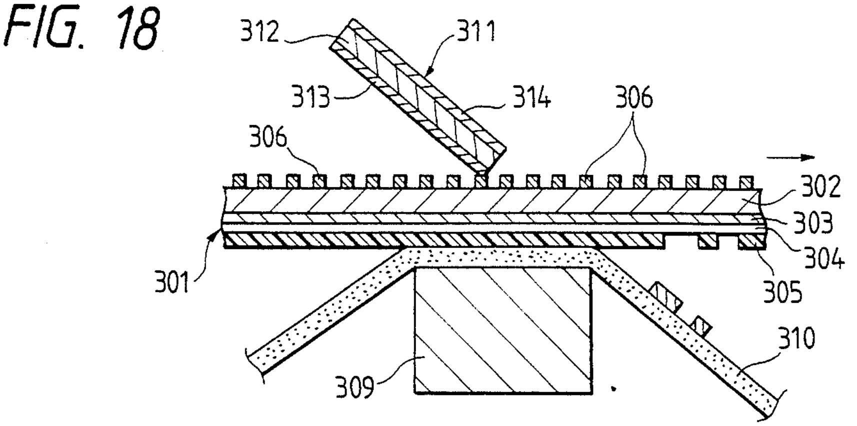
FIG. 18 is a cross-sectional view showing the structure of a printing unit.

As shown in FIG. 17, print storage medium 301 is transported on rollers 307 and 308. As print storage medium 301 is moved, it contacts transfer material 310, between print head 311 and pressure-urging roller 309. Transfer material 310 is continuously supplied from a roll of transfer material 320. As shown in FIG. 18, resilient member 312 of printing head 311 has a front surface provided with a pattern electrode 313 and a rigid urging plate 314 laminated to its rear surface. The electrodes 313, are thin belt-shaped conductive elements disposed regularly at predetermined intervals, each corresponding to a conductive picture element. FIG. 18 shows pressure urging roller 309 having a square cross section.

A picture signal voltage is applied to the pattern electrodes 313 of the printing head 311. Return electrode layer 303 of print storage medium 301 is grounded. A DC bias voltage may also be applied to return electrode layer 303.

Figure 19:
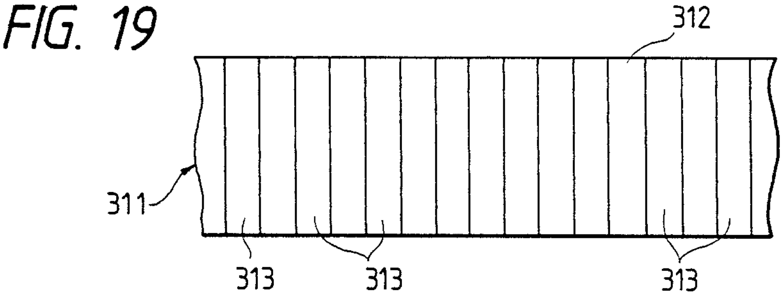
FIG. 19 is a top view showing an electrically conductive pattern of the print head.

FIG. 19 shows another way of applying the signal voltage, in which the picture signal input is applied across printing head 311 and return electrode layer 303 in synchronism with the signal voltage. In this way, drive efficiency may be improved.

Experiment 1

A print storage medium as just described was assembled for evaluating printing characteristics. Electrically conductive carbon particles were dispersed in a polyamide resin film to provide heat generating layer 302 with electrical conductivity. Heat generating layer 302 had a resistivity of 5.0 ohm-cm and a thickness of 35 μm. Circular microscopic electrodes 306 were formed over the entire surface of heat generating layer 302 through a screen printing method. The microscopic electrodes 306 had a diameter of 50 μm, a thickness of 16 μm, and a pitch of 70 μm. A mixture of 70 wt% silver particles having diameters of less than 1 μm and 30 wt% epoxy resin was used for the material of the microscopic electrodes 306.

A high frequency sputtering method was used to form a film of Al having a thickness of 1200 Å on the bottom side of heat generating layer 302 to provide the return electrode layer 303. A heat-cured silicone resin was then applied to the surface of the return electrode layer 303 and was dried and cured to form an ink release layer 304. The ink release layer 304 had a thickness of 0.2 μm and a critical surface tension of 34 dyn/cm. An 8 μm thick ink layer 305 having a melting point of 97° C. and containing 4 wt% color material was provided on the surface of ink release layer 304.

The resulting print storage medium 301 was used with printing head 311 having pattern electrodes 313. The pattern of electrodes had a pitch of 8 lines/mm with each individual electrode 313 having a diameter of about 45 μm. Picture signals having a pulse width of 400 μm and voltages of 10 V, 13 V, and 16 V, were applied to print head 311. High quality paper was urged against the ink layer 305 with a pressure of 3000 g/cm$^2$.

This printing experiment resulted in clear dot prints of circles having diameters of 65 μm, 102 μm, and 142 μm, respectively. Thereafter, the surfaces of the microscopic electrodes 306 were examined under an optical microscope and no damage or abnormality was observed.

Comparison

A similar experiment was then conducted except that the medium was not provided with microscopic electrodes. Applying a voltage of 10 V did not produce any print dots at all. A print dot of 63 μm was observed when a voltage of 13 V was applied, and a print dot of 82 μm was observed when a voltage of 16 V was applied. As apparent from this experiment, if the microscopic electrodes 306 are not provided, then print dots are not produced at all at low voltages and the print dots will be relatively small at higher voltages.

Observing the surface of this comparison print storage medium 301 after the print test, it was found that a voltage of 10 V caused dents having diameters of 60 μm. A voltage of 13 V caused damage to the surface including dents having diameters of 110 μm and depths of 4 to 5 μm. A voltage of 16 V caused severe dents having diameters of 150 μm with the central portion of the damage reaching the other surface of the heat generating layer 302.

Experiment 2

Heat generating layer 302 was made of a polyamide resin film dispersed with electrically conductive carbon particles to provide electrical conductivity. Heat generating layer 302 had a surface resistivity of 480 ohm-cm$^2$ and a thickness of 45 μm. Circular electrically-isolated microscopic electrodes 306 each having a diameter of 25 μm and a thickness of 12 μm, and being provided with a pitch of 40 μm was formed over the entire surface of one side of heat generating layer 302. The microscopic electrodes 306 were formed of a mixture of Ni particles (65 wt% and an average diameter of 1 μm) and epoxy resin (35 wt%).

Return electrodes 303 were formed on the other side of heat generating layer 302 using a method of vacuum deposition. This produced a 1500 Å thick film of Al. A dipping method was used to apply a heat-cured silicone resin to the surface of return electrodes 303. Ink release layer 304 having a thickness of 0.2 μμm and a critical surface tension of 33 dyn/cm was obtained after 1 hour drying at 200° C. for curing. Finally, an ink layer 305 having a thickness of 8 μm, a melting point of 96° C., and a surface tension of 42 dyn/cm, was provided on the surface of ink release layer 304.

The resulting print storage medium 301, had print head 311 and pattern electrodes 313 formed of squares of Ni having 60 μm sides and a pitch of 125 μm. Picture signals having 700 μm width pulses and voltages of 8 V, 10 V, and 12 V were applied to head 311. A sheet of high quality paper was urged against the head under a contact pressure of 30 g/cm$^2$.

Printing was then performed, and print quality was evaluated. The resulting pictures were of circular dots having diameters of 96 μm, 118 μm, and 149 μm, respectively. The 8V dot was a roundish square, the 10V dot was somewhat more square and the 12V dot was more circular but had uneven circumferences.

The surfaces of the microscopic electrodes 306 were examined under an optical microscope. No damage or abnormality was observed.

Figure 20:
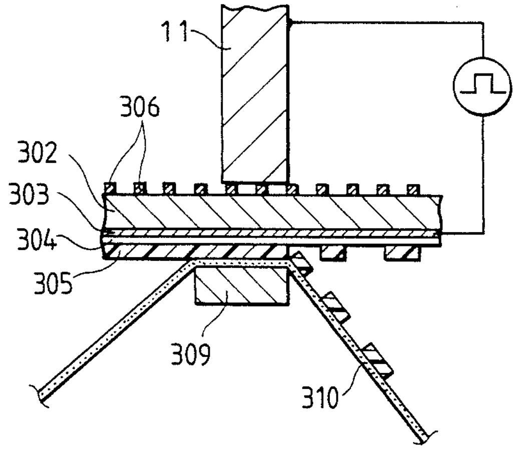
FIG. 20 is a cross-sectional view illustrating a method for applying the print signal.

FIG. 20 illustrates a fourth embodiment of the print storage medium 301 in which electrically conductive layer 303 and ink layer 305 are placed one over the other on the bottom surface of a heat generating layer 302 an electrically-isolated microscopic electrodes 306 are provided on the surface of heat generating layer 302. These microscopic electrodes 306 are formed of an electrically conductive resin.

Since a print storage medium is provided with electrically-isolated microscopic electrodes 306 placed over the ink layer 305 on the bottom surface of the heat generating layer 302, picture signal current passing through the heat generating layer 302 generates heat that is efficiently transferred to the ink layer 305 to permit high speed printing and dot modulation. Heat generating layer 302 provides print storage medium 304 with mechanical strength. The microscopic electrodes 306 provided on the front surface of heat generating layer 302 allow current to flow through the heat generating layer 302. This arrangement will not lead to energy loss otherwise caused by current dispersion. In addition, the microscopic electrodes 306, when formed of resin, have resiliency and flexibility to assure stable contact with the printing electrode 311 during slidable engagement. Further, microscopic electrodes 306 formed of resin having good bonding properties with the resin that conventionally forms the heat generating layer 302. This improves the mechanical strength of microscopic electrodes 306. In addition, microscopic electrodes 306 formed of resin can be easily formed on the front surface of the heat generating layer 302 through various processes such as printing to enable low cost production of the print storage medium.

The fourth embodiment as described above provides the following advantages.

(1) High speed printing and dot modulation is possible.

(2) The print storage medium has sufficient strength and low energy loss.

(3) The invention produces high quality color pictures and allows for durable print storage and high level gradation.

(4) The microscopic electrodes can be easily provided at a low cost.

(5) Wear and tear of the microscopic electrodes are minimized and mechanical strength is improved.

What is claimed:

1. A print storage medium comprising:
   - a heat generating layer capable of generating heat in response to a current passed therethrough, said current being supplied by a print electrode, said heat generating layer having a first surface and a second surface;
   - an electrically conductive layer provided on said second surface of said heat generating layer;
   - an ink release layer provided on said electrically conductive layer;
   - an ink layer provided on said ink release layer; and
   - a plurality of microscopic electrodes provided on said first surface of said heat generating layer, said microscopic conductors being electrically isolated from each other and formed of an electrically-conductive resin.

2. A print storage medium as set forth in claim 1, wherein said electrically conductive layer is formed of return electrodes in the shape of stripes.

3. A print storage medium as set forth in claim 1, wherein said heat generating layer has a resistivity in the range of $10^{-2}$ $10^{3}$ ohm-cm, a heat resistance of 200° C. or more, a thickness between 1000 Å and 100 μm and comprises an electrically conductive powder dispersed in a resin type material.

4. A print storage medium as set forth in claim 1, wherein said heat generating layer has a resistivity between $10^{-1}$ and $10^{2}$ Ω-cm, a heat resistance of 300° C. or more, and a thickness between 1 and 50 μm.

5. A print storage medium as set forth in claim 1, wherein said electrically conductive layer comprises an electrically conductive material selected from a group consisting of metals, alloys of metals, carbon, electrically conductive ceramics and electrically conductive organic materials, said conductive layer having a thickness between 500 Å and 10 μm.

6. A print storage medium as set forth in claim 1, wherein the ink release layer comprises a resin having a critical surface tension less than 37 dyne/cm.

7. A print storage medium as set forth in claim 1, wherein the ink layer comprises a dye dispersed in a bonding material, said ink layer having a melting point of 200° C. or less and a glass transition temperature of 120° C. or less.

8. A print storage medium as set forth in claim 1, wherein the microscopic electrodes comprise resin materials containing electrically conductive powders having a resistivity of 10% or less of the resistivity of the heat-generating layer.

9. A print storage medium as set forth in claim 8, wherein said resin materials are chosen from a group consisting of polyimide resin, polyester resin, silicon resin, epoxy resin, polydiphenyl ether resin, polyamide imide resin and polyesterimide resin.

10. A print storage medium as set forth in claim 1, wherein said microscopic electrodes have a thickness between 0.5 and 50 μm.

11. A print storage medium as set forth in claim 1, wherein the microscopic electrodes are regularly disposed laterally and longitudinally with a predetermined space between rows and cover between 20 and 80% of the surface of said heat-generating layer, said microscopic electrodes having a size being 80% or less that of a print electrode.

12. A print storage medium as set forth in claim 1, wherein the microscopic electrodes are formed in the shape of circles having diameters between 1 and 150 μm.

13. A print storage medium as set forth in claim 1, wherein the scopic electrodes are formed in the shape of squares having sides of between 5 and 150 μm.

* * * * *

UNITED STATES PATENT AND TRADEMARK OFFICE
CERTIFICATE OF CORRECTION

PATENT NO. : 4,967,206
DATED : October 30, 1990
INVENTOR(S) : Eiichi Akutsu et al.

It is certified that error appears in the above-identified patent and that said Letters Patent is hereby corrected as shown below:

Title Page, Inventors, delete [Yoshihiko Fujimura; Nanao Inoue; Kiyoshi Horie; Hiroshi Fujimagari];

Claim 3, Column 22, Line 11, before "$10^3$" insert --to--;

Claim 13, Column 22, Line 59, change "scopic" to --microscopic--.

Signed and Sealed this

Twenty-seventh Day of October, 1992

*Attest:*

DOUGLAS B. COMER

*Attesting Officer* *Acting Commissioner of Patents and Trademarks*